Aug. 7, 1928.                B. FELGER                1,679,416
QUICK CHANGE LINK
Filed Sept. 7, 1927
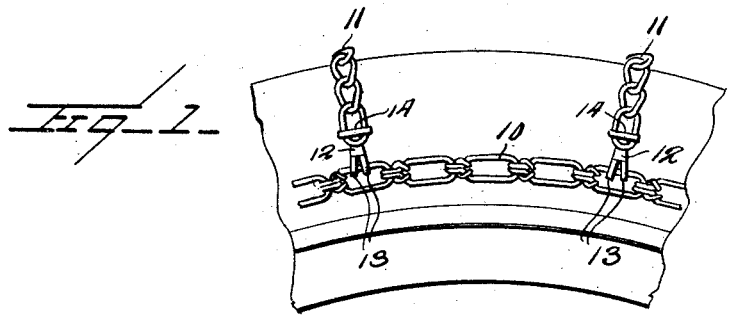
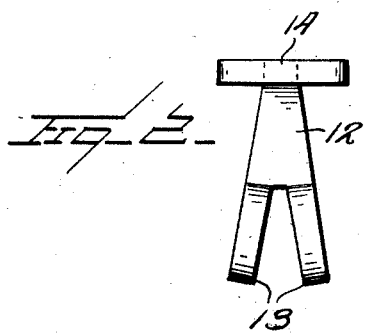
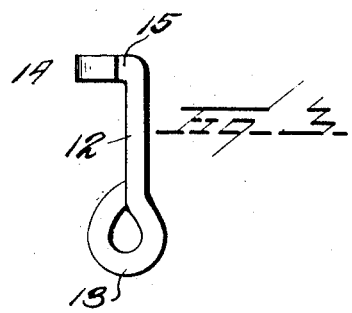
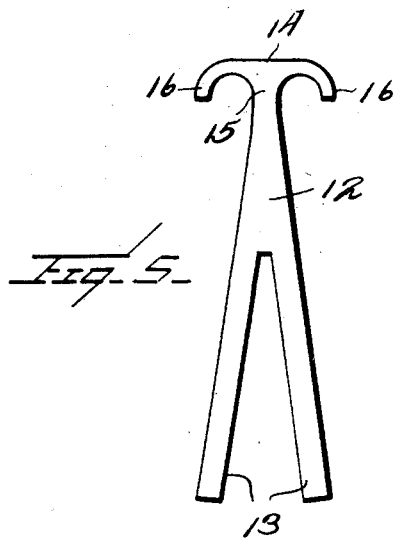
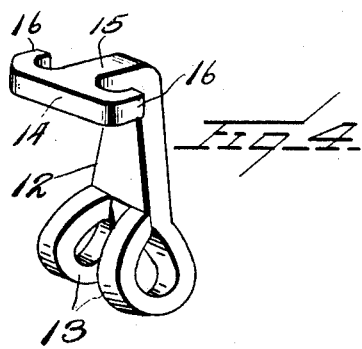
Inventor
B. Felger
By Watson E. Coleman
Attorney Patented Aug. 7, 1928.

1,679,416

UNITED STATES PATENT OFFICE.

BOB FELGER, OF ASHTABULA, OHIO.

QUICK-CHANGE LINK.

Application filed September 7, 1927. Serial No. 218,053.

This invention relates to tire chains and particularly to the links connecting the circumferential chains to the cross chains.

The general object of the present invention is to provide a link of this character which is very simple and which may be cheaply made and which does away entirely with the necessity of using a tool for removing or detaching a cross chain from the circumferential chain or replacing the cross chain.

A further advantage of the device resides in the fact that the cross chain may be very simply and quickly removed or replaced without difficulty and without danger of injuring the clothes.

A further object of the invention is to provide a device of this character which, when in place, will positively hold the cross chains from any chance detachment.

My invention is illustrated in the accompanying drawing, wherein:—

Figure 1 is a side elevation of a tire and rim with my link in applied position on an anti-skid chain;

Figure 2 is an outer face view of the link;

Figure 3 is a side elevation of the link;

Figure 4 is a perspective view of the link;

Figure 5 is a plan view of the link blank.

Referring to these drawings, it will be seen that 10 designates one of the circumferential chains of a tire chain or anti-skid chain and 11 designates the adjacent links of a cross chain. These chains 10 and 11 may be of any suitable form and character, but the links of the cross chain are illustrated as being twisted links. My device comprises a link 12, the blank of which is shown in Figure 5. This blank is bifurcated at one end to provide two diverging hooks 13 which, as illustrated in Figure 1, are adapted to engage one of the longitudinal links 10. The other end of the link 12 is formed with a T-shaped head 14 which is bent into angular relation to the shank of the link so as to provide an angularly disposed neck 15 and the T-shaped head 14 previously referred to, this T-shaped head forming two arms 16 which are curved toward the body of the link and provide upon their inferior faces two concavely curved seats for the adjacent portions of a link 11.

In the use of this device, the hooks 13 are clamped around the bar of a longitudinal link 10 by hammering or pressing upon these hooks 13, until the hooks 13 are practically closed, so that there is no chance of detachment between the link 12 and the link 10. The neck 15 extends nearly at right angles to the body of the link and the T-head may be engaged with a link 11 by turning this head into an approximately parallel position to the length of the link, then inserting one of the arms of the head into the link and pushing the other arm upward through the link and turning the link at right angles so that the bight end of the link will be disposed within the seats formed on the inferior faces of the arms 16. Under these circumstances, the cross bar or T-head will lie diametrically across the link and absolutely prevent any detachment between the link 12 and the link 11, so long as the chain is taut. If, however, the chain be slackened, detachment will be practically prevented except where it is intended that the links shall be disengaged and the links 12 and 11 are manipulated with that end in view to bring the T-head longitudinally of the link 11.

It will be seen that the link 12 may be very cheaply constructed, that it may be readily applied and that no tools are needed in order to disengage a cross link from the link 11 or engage it with the link 11. The link 12 may be readily applied to the longitudinal chain 10 or removed therefrom, though the application and removal of the hooks 13 to the link 10 will require a tool. The circumferential chains 10, however, very rarely become injured and it is only the cross chains which require to be replaced, so that there is no necessity under ordinary circumstances of removing the link 12 from the links of the chain 10.

Minor variations, it is obvious, may be made in the details of construction and arrangement of parts without departing from the spirit of the invention, as defined in the appended claim.

I claim:—

A quick-change link for cross chains bifurcated at one end to form a pair of normally closed hooks adapted to engage a link of a longitudinal chain, the other end of the link being formed with a relatively narrow neck extending at an angle to the body of the link and laterally extended at its end to form two laterally projecting arms curved toward the body of the link and adapted to engage the bight end of a cross chain.

In testimony whereof I hereunto affix my signature.

BOB FELGER.